July 8, 1969     E. E. MUELLER     3,454,433
LOW TEMPERATURE TEMPORARY PROTECTIVE CERAMIC COATING
COMPOSITIONS FOR METALS, AND RESULTING
COATED METAL ARTICLES
Filed April 3, 1964
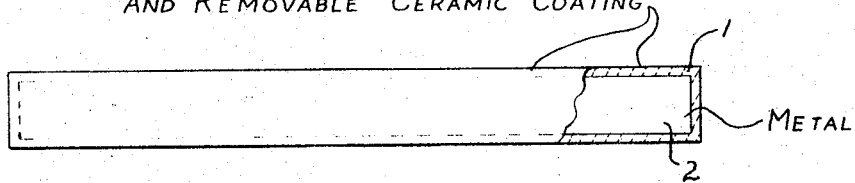
EDWARD E. MUELLER
INVENTOR.
BY
ATT'Y

United States Patent Office 3,454,433
Patented July 8, 1969

3,454,433
LOW TEMPERATURE TEMPORARY PROTECTIVE CERAMIC COATING COMPOSITIONS FOR METALS, AND RESULTING COATED METAL ARTICLES
Edward E. Mueller, Baltimore, Md., assignor, by mesne assignments, to SCM Corporation, New York, N.Y., a corporation of New York
Filed Apr. 3, 1964, Ser. No. 357,136
Int. Cl. C23c 1/12
U.S. Cl. 148—22                     20 Claims

ABSTRACT OF THE DISCLOSURE

Novel low temperature ceramic coatings adapted for temporary application to metals, during heat treatment for metallurgical and/or fabrication purposes, to temperatures of about 1,300–1,850° F. and coated metal workpieces are described. The compositions which form the coatings comprise a defined frit composition whose major components are a mixture of alkali metal oxides, silica, and $B_2O_3$, at least one refractory material selected from the group consisting of silica, alumina, and feldspar and an innocuous liquid carrier containing dispersed solidifiable organic resin in which the frit composition and refractory materal is dispersed and suspended for coating application purposes. Metal articles coated with coatings from the coating compositions are also described.

---

This invention relates to low temperature ceramic coatings adapted for temporary application to metals to thereby protect the latter while being heated for metallurgical and/or fabrication purposes to temperatures of about 1,300°–1,850° F. The invention also relates to the resulting coated metals.

In the processing of most steels and of many other kinds of metals which react at elevated temperatures with oxygen, nitrogen, hydrogen and/or carbon-containing gases, it is necessary at some stage to heat ingots, bars, billets, and other configurations in order to facilitate their fabrication into different shapes or to develop certain metallurgical properties. The temperatures involved are oftentimes high enough to cause deleterious reactions to occur unless preventative steps are taken. These detrimental reactions assume many forms but, most notably in iron alloys, they may involve oxidation or decarburization. In the case of oxidation particularly, considerable losses of metal are common in the form of the oxide coating which is developed. One method of alleviating this difficulty is through the use of a controlled atmosphere furnace. In instances where large sizes are encountered, however, the cost of such an operation can be prohibitive.

Another means for accomplishing the same end considerably more economically is through the use of temporary protective coatings. In general these protective coatings serve as a barrier between the metal substrate and the furnace or ambient atmosphere and prevent the diffusion of gasified materials from the metal into the atmosphere or, conversely, the passage of gaseous contaminants to the metal substrate.

Coatings of various types have been used extensively for metal protection on a more or less permanent basis. Such coatings have contained either organic or inorganic components or both, and may also have comprised predominantly metallic constituents. Conventional porcelain enamels are also in widespread use for permanent protection purposes.

Ceramic coatings of a temporary nature which have been developed in the past, although satisfactory from the point of view of protection, have had some limitations which have been overcome in the materials to be described hereafter. For the most part, entirely different inorganic components are here used in order (1) to extend the use range to considerably higher temperatures and (2) to be utilizable with the considerably more complex metal alloys which have been developed during recent years. In addition, organic components are utilized as binders for the inorganic materials. Through use of the latter, it has been possible to develop considerable handling resistance which is necessary in order to avoid damage to the coating from mechanical handling operations usually encountered in metal-working plants.

In order that such ceramic coatings may be applied to a variety of metal-processing operations, they must have certain physical and chemical properties. Among these are the following:

(1) The consistency of the coating must be such as to permit application by spraying, brushing, or dipping.

(2) The coating must have a satisfactory "shelf life," i.e., must be a stable suspension or dispersion avoiding excessive settling.

(3) The coating must dry rapidly under ambient conditions or under force-dry conditions at moderately elevated temperatures.

(4) The coating must be resistant to serve handling operations.

(5) The coating should not evolve material(s) which would be harmful to heat-treating furnaces, other equipment, or personnel.

(6) The coating should be continuous at relatively low temperatures and maintain this continuity through the entire temperature range to which the metal is exposed.

(7) The viscosity of the coating at the desired heat-treating temperatures should be such as to prevent the diffusion of gaseous materials.

(8) The coating should be free from ingredients which would cause metal contamination or deterioration.

(9) The coating must be readily removable after the metal's heat treatment, either by chemical or mechanical means or by spontaneous thermal spalling.

(10) The coating must be compounded from materials such that its total cost would be commensurate with or less than the savings gained from its use, either from prevention of metal loss or retention of original surface condition.

The coatings described belom are all characterized by a majority of the properties itemized above.

In general the temporary protective ceramic coatings field can be divided into three broad areas on the basis of temperature and, to some extent, on the reactions likely to be encountered in these temperature ranges. In most common steels and, more particularly, in some of the more recently developed tool steels, decarburization is likely to occur at relatively low temperatures of 1,300° F. to 1,850° F. Oxidation will also occur in this temperature range, although in developing the optimum metallurgical requirements in the substrate metal decarburization is often considered to the more critical reaction. In general, I use a vitreous-type coating to prevent such reactions. Owing to the mass of the metal often encountered and the low temperatures involved, the coatings used in this range are most readily removed by chemical treatment or by mechanical means, rather than by self-spalling.

An intermediate temperature range from 1,800° to 2,200° F. may be encountered with stainless steels and other high alloys where annealing or heat-treating operations are used in order to develop the desired metallurgical characteristics. Owing to the low carbon content of such metals and their inherently greater resistance to oxidation, I use coatings of considerably different compositions from those in the first temperature range, although they are still basically of a vitreous nature. They may, however, contain certain crystalline components in order to develop the appropriate thermal spalling characteristics.

The third temperature range encountered may be described as a hot-working range and may involve temperatures as high as 2,400° F. Since size reduction and shape change may follow heat treatments of this nature, the characteristics of the coating may require considerable alteration. Where oxidation protection alone is desired for one reason or another, a vitreous-type coating may be satisfactory. On the other hand, where operations such as forging and hot rolling are to follow, the lubricity characteristics of the coating material are paramount and may require the utilization of a coating which is entirely crystalline in nature or one with only a minor amount of a vitreous component.

For all three temperature ranges, I have developed different coating compositions providing either adequate oxidation protection or decarburization resistance or both. See copending applications Ser. No's 357,135, 357,137, and 357,255, filed simultaneously with the present application and assigned to the same assignee as the present application.

In addition, the inorganic materials which have been utilized are suspended and dispersed in a liquid vehicle containing one or another type of solidifiable binder resin, such that when the coating is applied and dried, it has sufficient strength to permit handling and some abuse. This insures that the coating will remain in place until the coated metal part has been transported to and inserted in the heat-treating or annealing furnace. The optimum organic binder components are those which are readily eliminated within the furnace without destroying the continuity of the coating or without leaving residual matter which may interfere with the efficacy of the inorganic components of the coating system.

Thus, the low temperature coating systems which are hereinafter described deal not only with the fritted vitreous components to which are added certain refractory materials, but also with the liquid carrier containing organic solidifiable resinous binder.

Protective coatings for the low temperature range applications which I have developed comprise fritted alkali borosilicate glasses with additions of refractory materials such as silica, alumina, and feldspar.

The heat treatment of metal in low tempertaure ranges is often of a long time duration. Thus, since the glasses alone have a tendency to absorb iron from the substrate and lose their protective qualities, additions of more refractory ingredients is required. It is assumed that these additives are slowly dissolved in the vitreous matrix, keeping the molten system at a more or less constant viscosity condition and nullifying the effect of the metal diffusion into the glass coating. This glass barrier also prevents the passage of gaseous contaminants from the furnace atmosphere to the metal substrate, and it also prohibits the establishment of a carbon concentration-gradient leading to decarburization effects.

I have found that while a single frit plus the silica, alumina or feldspar additives may perform satisfactorily in this low temperature field of application, it is often better to use a blend of two or three frits in order to take advantage of the resulting extended softening range. Such a blend of frits also leads to greater suspension stability when a clay/water carrier system is used owing to differences in solubilities of the individual frits.

Accordingly, it is an object of this invention to provide novel coating compositions comprising fritted alkali borosilicate glasses and refractory materials such as silica, alumina and/or feldspar.

It is a further object to provide coating compositions of the foregoing types dispersed in aqueous solutions, emulsions or organic solvent solutions of solidifiable organic binder material.

A further object is to provide coated metal articles in which the coating in a dry film of the coating compositions identified in the preceding objects.

These and other objects will be understood from the foregoing and following description of the invention, taken in conjunction with the attached figure of drawings which is a side view of a coated metal articles of the invention, with a portion of the coating 1 broken away to reveal the metallic substrate 2.

While the compositions of the frits used are, of course, important, the proper amounts of the individual frit components and the final critical ratios of total frit to refractory additive(s) are the controlling factors in the oxidation and decarburization resistance achieved. Thus the composition range of the frits found to be workable in this invention can be expressed as follows:

|  | Maximum | Minimum |
|---|---|---|
| Total alkali ($Na_2O+K_2O+Li_2O$) | 24 | 14 |
| $B_2O_3$ | 21 | 10 |
| $Al_2O_3$ | 10 | 3 |
| $SiO_2$ | 57 | 30 |
| CaO | 9 | 0 |
| BaO | 15 | 0 |
| $P_2O_5$ | 3 | 0 |
| Fluorine | 5 | 0 |

Examples of preferred compositions of the frits which are used individually or in various combinations in the preferred systems hereof are as follows, in weight percent:

|  | A | B | C | Range, percent |
|---|---|---|---|---|
| Alkalies ($Na_2O\pm K_2O\pm Li_2O$)[1] | 16.9 | 21.9 | 18.6 | 16.9–21.9 |
| $B_2O_3$ | 15.8 | 12.4 | 16.1 | 12.4–16.1 |
| $Al_2O_3$ | 7.6 | 9.0 | 3.6 | 3.6–9.0 |
| $SiO_2$ | 52.7 | 46.0 | 37.6 | 37.6–52.7 |
| CaO | 4.2 | 6.4 | 5.1 | 4.2–6.4 |
| BaO |  |  | 12.3 | 0–12.3 |
| $P_2O_5$ |  |  | 2.0 | 0–2.0 |
| Fluorine | 2.6 | 4.1 | 43. | 2.6–4.3 |

[1] The symbol ± is used to mean _____ and/or _____.

It will be understood that feldspars are alkali and/or alkali earth alumino-silicates, and hence that the foregoing compositions can have portions of the specified oxides contributed by a wide selection of starting materials; e.g., carbonates, cryolite, borax, clay, $CaF_2$, sodium silico fluoride, feldspar, etc.

The following examples are presented to illustrate systems which have been found to be effective in the prevention of oxidation and decarburization when used in conjunction with high carbon steels heat-treated at 1,300° F.–1,800° F.

EXAMPLE I

The coating used consisted of the following, in parts and percent by weight:

| Comminuted Inorganic Materials | | |
|---|---|---|
| Fritted components | Frit A | 60 } 50% |
|  | Frit B | 20 |
|  | Frit C | 20 |
| Refractory additives | Feldspar | 8 |
|  | Silica | 10 |

| Liquid Binder Carrier | |
|---|---|
| Acryloid F–10[1] | 57.7% } 50% |
| Mineral spirits | 41.3% |
| Aluminum stearate | 1.0% |

[1] Acryloid F–10 is a solvent solution of poly(butyl methacrylate) 35 resin; 40% solids; Gardner-Holdt viscosity (at 40% solids) of G. The resin has a specific gravity of 0.91.

These materials were introduced to a porcelain-lined ball mill and ground to a fineness of 6–8% residue on a 200-mesh screen and applied by spraying to a dried thickness of 6 mils on a sample of H–11 tool steel plate. The coated metal was introduced in a gas/air furnace having an oxidizing flame and a temperature of 1,300° F., after which the furnace was raised to a temperature of 1,500°

F. and held for one hour. It was then raised to 1,850° F. and held for two hours, at which time the coated metal was removed from the furnace and air cooled. The coating was removed mechanically, as by sand-blasting. Decarburization depth was nil by micro-hardness measurements and 0.0005″–0.001″ by visual evaluation. H–11 tool steel is an allow composed of .35% C, 5% Cr, 0.4% V, 0.5% Mo, balance Fe.

Similar results are secured when the coating is applied to high-carbon steel and to other heat-treatable metals.

EXAMPLE II

The coating used consisted of the following in parts and percent by weight:

|  | Comminuted Inorganic Materials | |
|---|---|---|
| Fritted component | Frit C | 100 } 40% |
| Refractory additive | Silica | 22 |
|  | Water-base Binder Carrier | |
| Rhoplex AC–33 [1] |  | 55.6% } 60% [3] |
| Vinsol emulsion [2] |  | 44.4% |

[1] Rhoplex AC–33 is a nonionic alkaline aqueous emulsion of an acrylic ester polymer; pH 9–9.5; 46–47% solids. The acrylic ester polymer has a $T_f$ of 28° C.; that is, it forms a continuous film at about room temperature.
[2] Vinsol emulsion is an oil-in-water emulsion having a solids content of 50% (wt.); the internal (oil) phase is a hard pine resin which is insoluble in hydrocarbon solvents and has a methoxy content of 3–7% (wt.).
[3] This blend of emulsions leaves less than about 0.2% of residue (carbon and ash) when subjected to the Conradson or equivalent tests.

This organic vehicle composition is mixed with the inorganic powder so its percentage in the mixture is 60%. Enough water is added subsequently to adjust the viscosity to suit the method of application.

The most suitable proportions of carrier blends have been found to fall in the range:

|  | Percent |
|---|---|
| Rhoplex AC–33 | 65–40 |
| Vinsol emulsion | 35–60 |

These materials were processed in the manner indicated in Example I and applied to the same type metal. In this instance the coated metal was inserted in the gas/air furnace at 1,300° F., the temperature raised to 1,650° F. and held for 10 hours, after which the temperature was lowered to 1,500° F. in 50° F. increments, holding 3 hours at each temperature. The samples were then furnace cooled to 1,000° F., removed and further air cooled. The coating was removed mechanically. Microscopic examination showed that no decarburization of the metal had occurred.

EXAMPLE III

The coated metal described in Example II was given the heat treatment described in Example I. No decarburization was noted by either microhardness measurements or microscopic examination.

EXAMPLE IV

|  | Comminuted Inorganic Materials | |
|---|---|---|
| Fritted components | Frit A — 60 grams | }  |
|  | Frit B — 20 grams | 77% |
|  | Frit C — 20 grams |  |
| Refractory material | Al$_2$O$_3$ — 15 grams |  |
|  | Solvent-type Binder Carrier | |
| Vinyl-toluenated-alkyd resin [1] |  | 28.2% } 23% wt. |
| Xylene or naphtha (or mixtures) |  | 71.8% |

[1] This thermosetting resin leaves a residue (carbon plus ash) of about 3.5% by weight when subjected to a Conradson or equivalent test.

These materials were introduced to a porcelain-lined ball mill and ground to a fineness of 6–8% residue on a 200-mesh screen. The resultant suspension was applied by spraying to a dried thickness of 8 mils on a sample of tool steel. The coated metal was heated for 30 minutes at a temperature of 1,550° F. and removed from the furnace. The coating was removed by sandblasting. Excellent protection from oxidation attack was noted.

EXAMPLE V

The aqueous emulsion carrier of Example II is replaced with an equal weight of a water-soluble hardenable resinous varnish prepared in accordance with Example 1 of U.S. Patent No. 2,981,710. The coating composition was otherwise prepared and tested in the manner described in Example II except that the wet piece of coated metal was first air-dried and then baked at 170–180° C. to thermoset the binder.

The coating provided good resistance to oxidation of the underlying metal in the furnace test of Example II.

Although I have made coating compositions of the present invention covering a wide range of mixtures of silica, feldspar, and the frits described above, I prefer to use feldspar or silica alone as in Example II rather than various ratios of the two, at a total level less than 35% when combined with frits such as A, B, or C above, and at a minimum level of about 5%.

It will be understood that the liquid binder carriers of the Examples can be replaced in toto with aqueous solutions or emulsions of a wide variety of solid and/or solidifiable resinous organic binding materials which leave a total Conradson residue less than about 3.5% by weight (ASTM Standards, 1946, Part III–A, p. 120) such as cellulose derivatives, glyceride drying oils, maleinized and amine-neutralized glyceride drying oils, rosin, maleinized and amine-neutralized rosin, nitrocellulose, carboxymethyl cellulose, cellulose acetate, cellulose butyrate, phenol/formaldehyde condensation products in various stages of resinification, amine-aldehyde and/or alkylated amine/aldehyde condensation products in various stages of resinification, thermoplastic copolymer resins, thermosetting copolymer resins, thermosetting reactive blends, etc. The water-insoluble materials can, if desired, also be used as binders by dissolving them in single or mixed volatile organic solvents.

Example IV illustrates the usefulness of organic resinous binders which have relatively high Conradson residues and illustrates the fact that in the oxidizing furnace atmospheres wherein the coatings of this invention find special merit, the high Conradson residues can be handled satisfactorily with no detrimental results to the underlying metal.

As will be obvious, the present invention stems from my discoveries of the frit/refractory mixtures which at the subject low temperatures exhibit unexpected protective effects, even in thin layers under 10 mils thickness, to the metallic substrates to which they are applied.

While the examples illustrate removal of the temporary ceramic coatings by mechanical means, it is well known that ceramic coatings can be removed by dissolution methods without harming the substrate, such as by immersing the coated article in hot aqueous caustic solutions, e.g. U.S. Patent No. 2,870,048.

Having described my invention, what I claim is:

1. An easily removable protective coating composition for metals to be heated to a temperature between about 1,300° F. and 1,850° F., which consists essentially of (A) a comminuted inorganic fritted component consisting essentially of the following ingredients having the following ranges of composition:

|  | By wt. (percent) |
|---|---|
| Total alkali (Na$_2$O+K$_2$O+Li$_2$O) | 14–24 |
| B$_2$O$_3$ | 10–21 |
| Al$_2$O$_3$ | 3–10 |
| SiO$_2$ | 30–57 |
| CaO | 0–9 |
| BaO | 0–15 |
| P$_2$O$_5$ | 0–3 |
| Fluorine | 0–5 | said percentages being selected to total 100%; (B) comminuted refractory material selected from the class consisting of silica, alumina, feldspar and mixtures thereof, said refractory material in toto amounting to from 5% to 35%, by weight, based on the total weight of said fritted component; and (C) an innocuous liquid carrier containing dispersed solidifiable organic resin in which said fritted component and said refractory material are dispersed and suspended for application purposes.

2. A composition as claimed in claim 1 wherein said liquid carrier containing organic resin has water as its liquid base.

3. A composition as claimed in claim 1 wherein said liquid carrier consists essentially of a volatile organic solvent solution of solidifiable resinous organic binder.

4. A composition as claimed in claim 1 wherein said comminuted fritted component consists essentially of at least two different fritted compositions mixed together, each of said fritted compositions falling within the compositional limits set forth in claim 1.

5. A composition as clamied in claim 4 wherein said mixture of fritted compositions has the following compositional limits:

| | By wt. (percent) |
|---|---|
| Alkalies ($Na_2O+K_2O+Li_2O$) | 16.9–21.9 |
| $B_2O_3$ | 12.4–16.1 |
| $Al_2O_3$ | 3.6–9.0 |
| $SiO_2$ | 37.6–52.7 |
| CaO | 4.2–6.4 |
| BaO | 0–12.3 |
| $P_2O_5$ | 0–2.0 |
| Fluorine | 2.6–4.3 | the selected amounts of said materials totaling 100%.

6. A composition as claimed in claim 4 wherein said mixture of fritted compositions consists essentially of the following three compositions A, B and C in a weight ratio of about 3:1:1.

| | In Weight Percent | | |
|---|---|---|---|
| | A | B | C |
| Alkalies ($Na_2O+Li_2O+K_2O$) | 16.9 | 21.9 | 18.6 |
| $B_2O_3$ | 15.8 | 12.4 | 16.1 |
| $Al_2O_3$ | 7.6 | 9.0 | 3.6 |
| $SiO_2$ | 52.7 | 46.0 | 37.6 |
| CaO | 4.2 | 6.4 | 5.1 |
| BaO | None | None | 12.3 |
| $P_2O_5$ | None | None | 2.0 |
| Fluorine | 2.6 | 4.1 | 4.3 |

7. A composition as claimed in claim 6 wherein said liquid carrier has water as its liquid base.

8. A composition as claimed in claim 7 wherein said refractory material consists of silica.

9. A composition as claimed in claim 7 wherein said refractory material of claim 1 consists of feldspar.

10. A composition as claimed in claim 6 wherein said liquid binding carrier consists essentially of a volatile organic solvent solution of solidifiable resinous organic binder.

11. A composition as claimed in claim 10 wherein said refractory material consists of silica.

12. A composition as claimed in claim 10 wherein said refractory material of claim 1 consists of feldspar.

13. A metal article coated with a thin dry coating of the composition claimed in claim 1.

14. A metal article coated with a thin dry coating of the composition claimed in claim 2.

15. A metal article coated with a thin dry coating of the composition claimed in claim 3.

16. A metal article coated with a thin dry coating of the composition claimed in claim 4.

17. A metal article coated with a thin dry coating of the composition claimed in claim 5.

18. A metal article coated with a thin dry coating of the composition claimed in claim 6.

19. A metal article coated with a thin dry coating of the composition claimed in claim 7.

20. A metal article coated with a thin dry coating of the composition claimed in claim 10.

References Cited

UNITED STATES PATENTS

| 2,827,393 | 3/1958 | Kadisch et al. | 106—48 |
| 3,025,188 | 3/1962 | Larsh et al. | 106—48 |
| 3,178,322 | 4/1965 | Schneider | 117—6 |
| 3,184,320 | 5/1965 | Michael | 106—49 |
| 3,278,324 | 10/1966 | Nelson | 106—48 |

FOREIGN PATENTS 549,118 11/1957 Canada.

OTHER REFERENCES

Fabian, "Strippable Coatings," Materials in Design Engineering, May 1959, pp. 110–15, 117–6.

HELEN M. McCARTHY, Primary Examiner.

U.S. Cl. X.R.

106—39, 48, 65; 117—6, 129; 148—18, 20.6, 28